Patented June 6, 1939

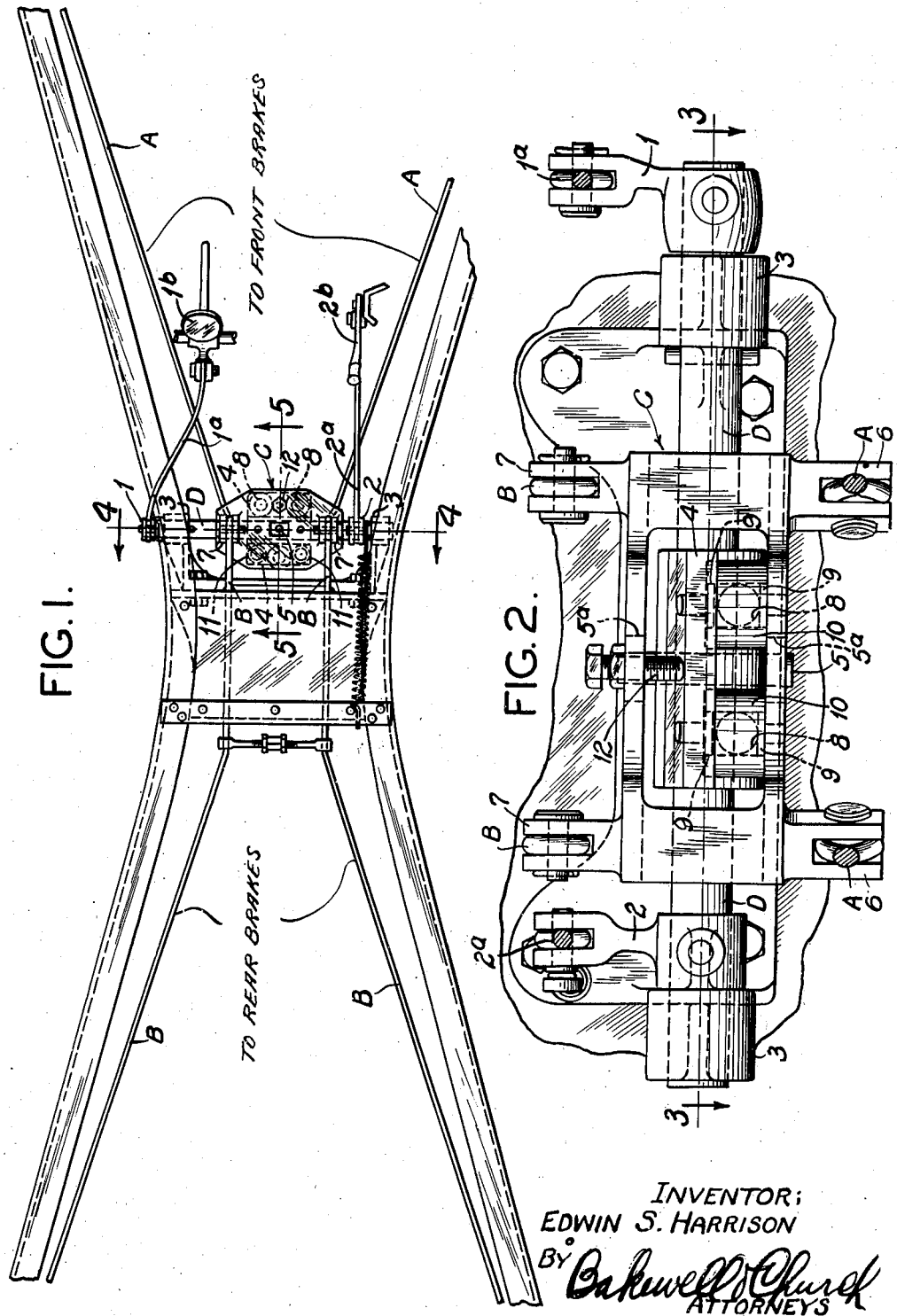

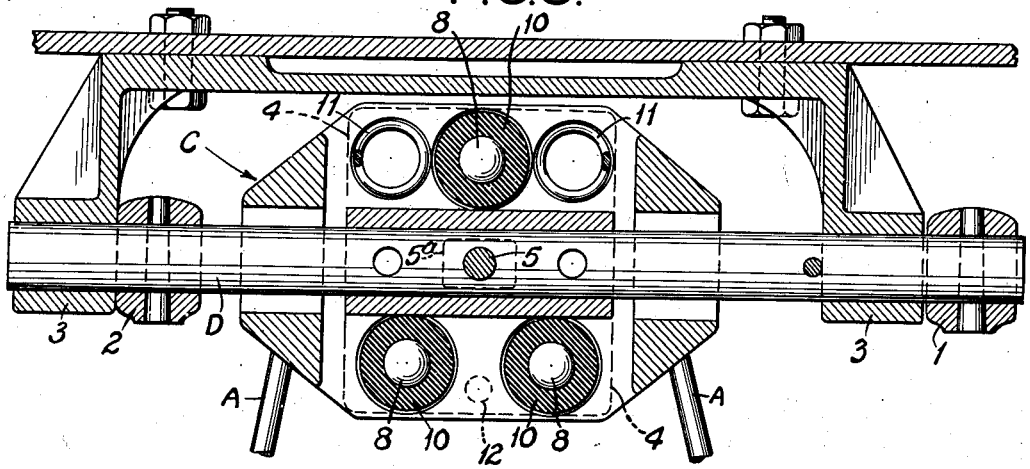
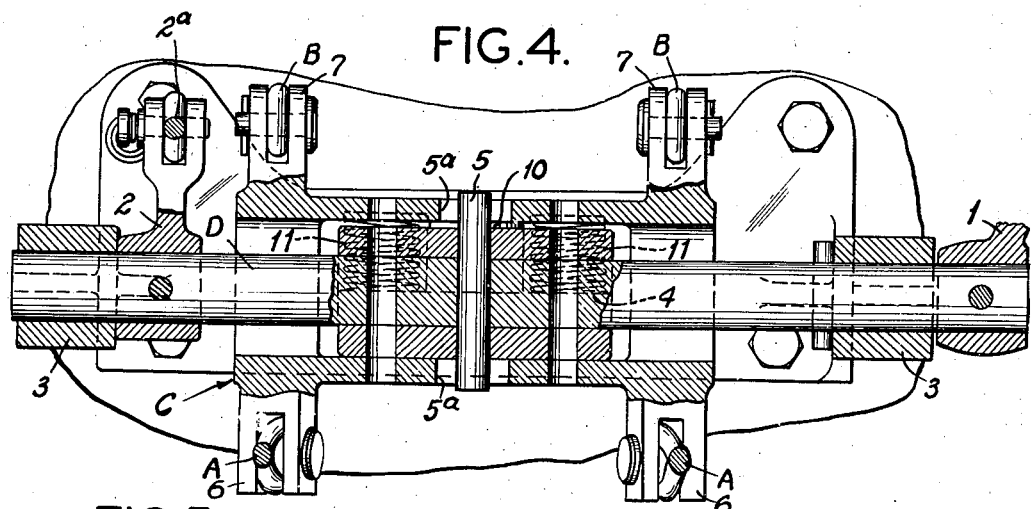
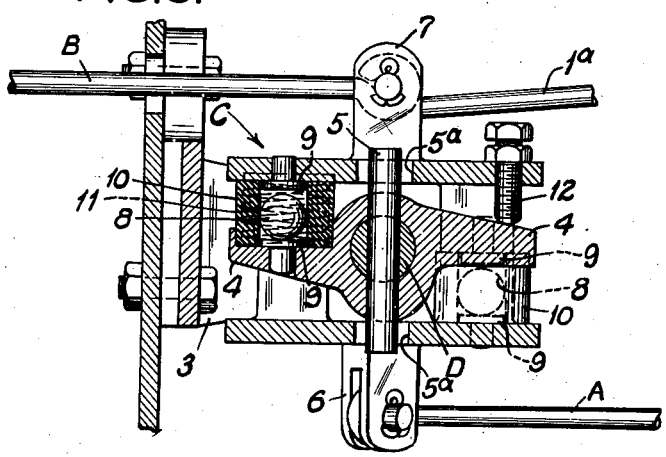

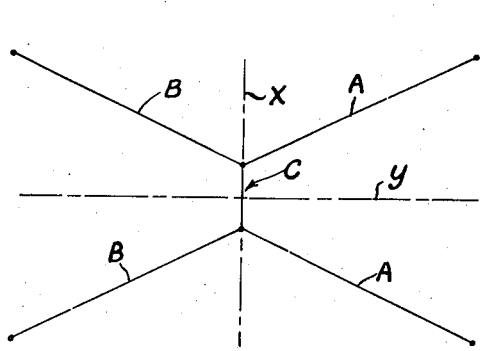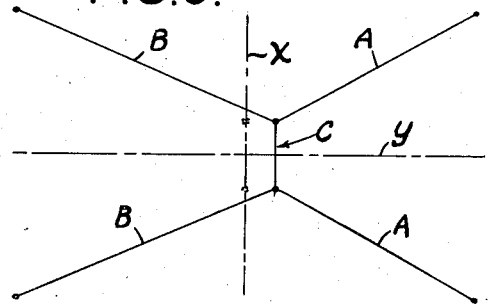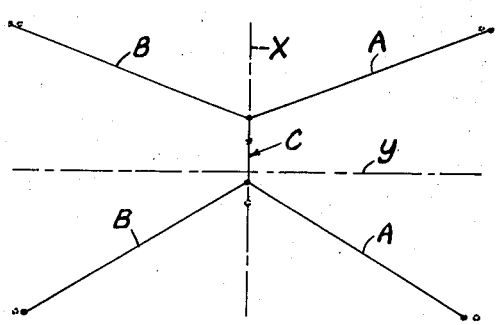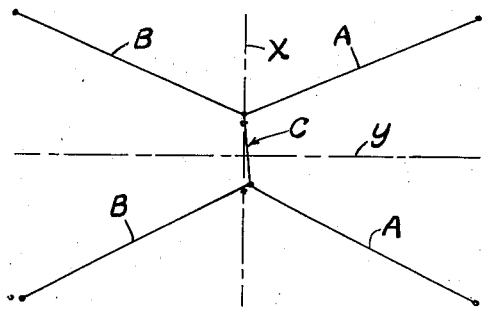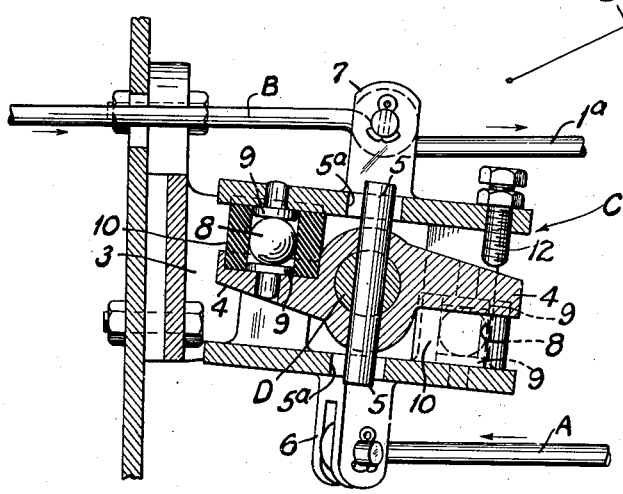

2,161,159

UNITED STATES PATENT OFFICE 2,161,159

BRAKE OPERATING APPARATUS FOR AUTOMOBILES AND SIMILAR VEHICLES

Edwin S. Harrison, Clayton, Mo.; Margaret J. Harrison administratrix of said Edwin S. Harrison, deceased Application October 18, 1935, Serial No. 45,588

12 Claims. (Cl. 188—204)

This invention relates to wheel brakes for automobiles and other power-operated vehicles, and particularly, brakes of the type in which the brake shoes or brake bands are normally maintained in an inactive condition by means of springs or equivalent devices, and are rendered active by the movement of rods, cables or links connected with an operating or control means.

One serious objection to mechanical wheel brakes of conventional construction is the difficulty of adjusting the brake shoes and the operating mechanism, so as to produce and maintain the apparatus in such condition that when the control means is actuated, the brake shoes will exert the full force designed for each wheel simultaneously on all the wheels. Another objection to conventional mechanically-operated wheel brakes for automobiles and similar vehicles, is that a variation in the length of one or more of the brake actuating devices, unequal wear on the brake shoes, and other mal-adjustments, causes the vehicle to steer off line or to skid.

The main object of my invention is to provide an operating mechanism for a plurality of wheel brakes that is inexpensive to construct, and which reliably causes or permits each wheel to perform its full share of the braking effort and effect the quickest possible stop with the least tendency to steer off line or to skid.

Another object of my invention is to provide a wheel brake operating mechanism of the general type that comprises a force producing or applying means, and a plurality of brake-actuating rods or equivalent devices for transmitting movement from said means to the brakes, which is of such construction that the brake rods or equivalent devices are capable of shifting relatively to the force applying means into various positions, so as to accommodate themselves to the condition of the respective brakes with which they are associated and produce an effect similar to that which would be obtained by varying the length of the rods by manual adjustment, so as to compensate for wear on the brake shoes, or other causes equivalent in effect to overall dimensional variations in the linkage. Other objects and desirable features of my invention will be hereinafter pointed out.

To this end I have devised an operating mechanism for the front and rear wheel brakes of an automobile or similar vehicle, that consists of a force producing or applying means comprising a part, which, for convenience, I will refer to as an operating member, brake actuating devices leading forwardly and rearwardly from said operating member to the front and rear brakes, respectively, and disposed so that the pair of actuating devices for the front brakes converge as they approach said operating member, and the pair of actuating devices associated with the rear brakes converge as they approach said operating member, and an equalizing or proportioning means for transmitting movement from said operating member to said brake actuating devices, consisting of a connecting element interposed between and pivotally or flexibly connected to the front and rear brake actuating devices and combined with said operating member in such a manner as to be capable of shifting relatively to same for the purpose of varying the angle of the brake actuating devices, and thus adjust the action of the brakes to various conditions, as hereinafter more fully explained. In the preferred form of my invention herein illustrated the connecting element just referred to is pivotally fastened to the brake actuating devices in such a way that said connecting element and said actuating devices form, in effect, a substantially cruciform-shaped structure of which the connecting element forms the center, and from which the brake actuating devices radiate, and said connecting element is combined with the operating member of the force producing or applying means in such a way that said element is capable of shifting longitudinally and transversely of said member and also turning slightly relatively to said member, during the movement of said connecting element to accommodate itself to the adjustment or condition of the brake actuating devices or the brakes to which said devices lead. Accordingly, if the wear on all of the brake shoes is the same, and other parts of the system remain in designed relation, the co-acting parts of said cruciform-shaped structure will be in fully symmetrical relation and will exert equal force, and said connecting element will occupy a position at approximately the center of the longitudinal axis of the vehicle, with one axis of said element extending in parallel relation to the axis of the operating member of the force applying means. However, if one or more of the brakes is out of adjustment, or is excessively worn, or if one of the actuating devices is abnormally expanded, contracted or bent, the connecting element will automatically assume such a position as to compensate for the inequality, difference, or variation in the brakes, but will continue to effectively equalize the force or pressure that is exerted on the brake actuating devices when said operating member functions. In other words, instead of connecting the brake actuating devices directly to rigid arms on a rock shaft, as has heretofore been the usual parctice, I pivotally or flexibly connect the rear ends of the front actuating devices and the front ends of the rear actuating devices to a connecting element that is capable of assuming various angular positions and shifting longitudinally and transversely of the operating member of the force producing or applying means, and which, in effect, floats between said member and the brake actuating devices to which movement is imparted by said operating member. In its operation of shifting relatively to the operating member, the connecting element changes the angular relationship between said member and the brake actuating devices, but the change is so slight as to not substantially affect the equalizing pull on the individual brakes.

The specific design or details of construction of said connecting element is immaterial and may be varied without departing from the spirit of my invention. In the form of my invention herein illustrated the operating member previously referred to consists of a rock shaft, and the connecting element is mounted in a substantially horizontal position and is constructed in the form of a substantially hollow, box-shaped structure through which said rock shaft extends transversely. Arms, plates or similar parts that project laterally from the rock shaft and which are housed inside of said box-shaped connecting element, cause said element to rock with the rock shaft during the operation of applying the brakes, and balls or other suitable friction-reducing bearings are preferably interposed between the connecting element and the parts on the rock shaft with which said element co-acts so as to reduce friction and permit said element to move freely when said element shifts to compensate for inequalities or differences in the brake shoes, or in other parts of the force distributing linkage or individual wheel mechanisms. I also prefer to combine a spring or springs with the connecting element and the arms or other parts of the shaft overlapped by said element, so as to take up play or lost motion between said parts and prevent the structure from rattling. Instead of constructing the connecting element in the form of a hollow member through which the rock shaft of the force applying means extends, the rockable part of the force applying means may consist of a hollow member, inside of which is arranged the floating or shiftable connecting element previously mentioned, to which the brake actuating devices are attached. The mechanism is applicable to a vehicle braking system comprising more than four brakes, and while I prefer to construct the equalizing means so that the long axis of the connecting element is disposed transversely of the vehicle, said connecting element could be arranged in various other ways and still produce the effect previously described.

Figure 1 of the drawings is a top plan view of a wheel brake operating apparatus embodying my invention.

Figure 2 is an enlarged front elevational view of said apparatus, as viewed from the right hand end of Figure 1.

Figure 3 is a horizontal sectional view, taken on the line 3—3 of Figure 2, looking in the direction indicated by the arrows.

Figure 4 is an enlarged transverse sectional view, taken on the line 4—4 of Figure 1, looking in the direction of the arrows.

Figure 5 is an enlarged vertical longitudinal sectional view, taken on the line 5—5 of Figure 1, showing the parts of the structure in their normal position.

Figure 6 is a view similar to Figure 5, showing the parts of the structure in the positions they occupy when the rock shaft of the force applying means is actuated to apply the brakes; and Figures 7 to 11 are diagrammatic views, illustrating the action or operation of the apparatus.

In the accompanying drawings which illustrate the preferred form of my invention, A designates a pair of rods, cables or other suitable actuating devices that lead rearwardly from brake shoes, brake bands or equivalent parts (not shown) associated with the front wheels of a vehicle, and B designates a pair of rods, cables or the like that lead forwardly from brake shoes associated with the rear wheels of the vehicle. The particular kind of brakes with which the apparatus is used is immaterial, so long as the brakes are of a type capable of being operated successfully by rods, cables, or equivalent linkage. The brake actuating devices A and B converge or lead inwardly towards the center longitudinal axis of the chassis of the vehicle, as shown in Figure 1, as said devices approach the operating member of the force-producing or applying means, and said actuating devices are pivotally or flexibly attached to a connecting element or member designated as an entirety by the reference character C. The operating member of the force applying means is herein illustrated as consisting of a rock shaft D with which the connecting element C is combined, said rock shaft being disposed transversely of the chassis of the vehicle, as shown in Figure 1, and provided with arms 1 and 2 that are connected by links 1ª and 2ª with a foot lever 1ᵇ and a hand lever 2ᵇ of conventional construction. As is usual, the rock shaft D is rockably mounted in bearings 3 carried by the chassis of the vehicle, as shown in Figure 2. The connecting element C is preferably constructed in the form of a substantially box-shaped structure, through which the rock shaft D extends transversely, and said rock shaft is provided with rigid arms 4 that impart a rocking movement to the connecting element C when the shaft D is rocked or oscillated by manipulating the foot lever 1ᵇ or hand lever 2ᵇ. As shown in Figures 5 and 6, the arms 4 project forwardly and rearwardly from the rock shaft D, and are housed inside of the connecting element C, both of said arms being integrally connected to a hub that is rigidly fastened to the rock shaft D by a pin 5. When the rock shaft D is actuated to apply the brakes, the arms 4 on said shaft cause the connecting element C to move into the position shown in Figure 6, thereby exerting a rearward pull on the front brake actuating devices A, and exerting a forward pull on the rear brake actuating devices B. Normally, the connecting element C occupies a substantially horizontal position, as shown in Figure 5. The front brake actuating devices A are herein illustrated as being pivotally connected at their rear ends to ears or bifurcated lugs 6 on the underside of the connecting element, and the rear brake actuating devices B have their front ends pivotally connected to ears or bifurcated lugs 7 on the top side of the connecting element C, but I wish it to be understood that it is immaterial how the devices A and B are joined to the connecting element C so long as said parts can turn, swing or rock relatively to each other. Accordingly, in the claims I have used the expressions "pivotally attached" and "pivotally connected" to mean any kind of a joint or connection between the element C and the devices A and B, which will permit said parts to swing, turn, rock, or oscillate relatively to each other, it being immaterial whether said connection is formed by a pivot pin, a ball and socket joint or a flexible structure.

The connecting element C is mounted on or combined with the rock shaft D in such a way that it will partake of the rocking movement of said shaft, and is also capable of shifting slightly longitudinally and transversely of said shaft. Said connecting element is also capable of a slight rocking or turning movement relative to the shaft D. Thus, in effect, the connecting element C is floatingly mounted on or combined with the rock shaft D, and the purpose of mounting said connecting element in this manner is to permit said element to automatically shift into a position to change the angularity of the brake actuating devices A and B, so as to compensate for inequalities in the brake shoes and other parts of the structure, and accurately equalize or constantly proportion the pressure or force that is exerted on the brake shoes when the rock shaft D is operated to apply the brakes.

In the diagrammatic views, Figures 7 to 10, inclusive, I have illustrated the brake actuating devices A and B as co-acting with the brake drums through individual wheel mechanism (not shown). If all of the brakes are in the same condition and the wear on all of the brake shoes is approximately the same, the co-acting parts of the cruciform structure made up of the brake actuating devices A and B and the connecting element C, will remain in symmetrical relation when the rock shaft D is actuated to apply the brakes, due to the fact that the pull on all of the brake actuating devices is the same. At such times the connecting element C is in parallel relationship with the axis $x$ of the rock shaft D, and the right and left hand brake actuating devices A and B are located the same distance from the longitudinal axis $y$ of the chassis of the vehicle, as shown in Figure 7. If, however, the brake shoes associated with the wheels on one side of the vehicle have become worn to a greater degree than the brake shoes associated with the wheels on he other side of the vehicle, thereby producing a difference in the action of the brakes when they are applied, the connecting element C will shift laterally, as shown in Figure 8, when the rock shaft D is actuated, due to the fact that the brake actuating devices associated with the brake shoes that have the greatest degree of wear exert a slightly different pull on the connecting element C than the brake actuating devices associated with the other brake shoes. In shifting laterally, as above explained, the connecting element C changes the angular relationship between the brake actuating devices A and B and the rock shaft D in such a way as to, in effect, vary the length of the actuating devices sufficiently to compensate for the wear on the excessively worn brake shoes and cause both the right hand and left hand actuating devices to exert substantially the same force or pressure to operate the brake shoes with which they co-act. Dependent upon which set of brake shoes have received the greatest wear (right hand or left hand) the connecting element C will move either to the right or to the left of the longitudinal axis $y$ of the chassis of the vehicle, as indicated in Figure 8, but will remain in parallel relationship with the axis $x$ of the rock shaft D. If only one brake gets out of adjustment, or if one brake actuating device is subjected to greater expansion or contraction than the other actuating devices, the connecting element C will remain centered with relation to the longitudinal axis of the chassis of the vehicle, but will shift automatically into an angular position with relation to the axis $x$ of the rock shaft D, as shown in Figure 10, when said shaft is actuated to apply the brakes, such shifting of the connecting element C effecting such a change in the angular relationship between the rock shaft and the brake actuating devices, that the defect is overcome or compensated for by the change in angularity of the actuating devices.

Briefly stated, my invention may be said to consist of a braking system for vehicles, comprising a force-applying means, a co-acting floating member, and suitable links or actuating devices diverging therefrom and operatively connected to a plurality of wheel brake mechanisms, said floating member and links co-operating with each other in such a way, that irrespective of the condition of the brakes, one link or actuating device cannot pull ahead of or independently of the other links. Where it is desired to exert a different degree of force on the actuating devices for the front wheel brakes as compared with the actuating devices for the rear wheel brakes, and still effectively equalize the force on the right and left hand brakes of the vehicle, the actuating rods or devices associated with the front and rear wheel brakes can be arranged as shown in Figure 9, thereby producing a structure that is substantially symmetrical about the longitudinal axis of the vehicle, but not otherwise symmetrical. From the foregoing it will be understood that in my improved brake operating apparatus the brake actuating devices A and B are not directly connected to the rock shaft or equivalent part D of the control means, but instead, are pivotally or flexibly connected to a member C that is mounted so as to partake of the rocking movement of the shaft D, but which is capable of automatically assuming various positions so as to, in effect, vary the effective length of the brake actuating devices, and thus compensate for inequalities in the brakes or the actuating means for same, resulting from wear, mal-treatment, expansion or contraction, friction, changes in climatic conditions, or other causes equivalent in effect to overall dimensional variations in the linkage.

As previously stated, the connecting element C of the apparatus may be constructed in various ways and still obtain the effect above described. In order to reduce wear or friction between the forwardly and rearwardly-projecting arms 4 on the rock shaft D, and the co-acting parts of the connecting element C that overlaps the said arms, I interpose ball bearings or equivalent friction-reducing bearings 8 between hardened wear plates 9 on said parts, as shown in Figure 6, said bearings 8 being preferably disposed in triangular relationship, as shown in Figure 3, with two bearings 8 on the front side of the rock shaft D and one bearing at the rear side of said shaft. The pin 5 that rigidly connects the arms 4 to the rock shaft D projects into holes 5ᵃ in the top and bottom portions of the connecting element C, which holes are made of such length and width as to provide for the previously explained longitudinal and transverse movement of the connecting element C relative to the rock shaft D, the pin 5 thus performing the additional function of a stop for limiting the movement or shifting of the connecting element C. The ball bearings 8 are held in operative position between the connecting element C and the co-acting arms 4 on the rock shaft D by means of tubular housing members 10 of rubber that surround said balls and which are interposed between the arms 4 and the overlapping portions of the connecting element C. To facilitate assembly of the structure and to take up any lost play or motion between the connecting element C and the arms 4, coiled springs 11 are interposed between one of said arms and the overlapping portion of the element C, at one side of the axis of the rock shaft D, and a set screw 12 is mounted in the element C at the other side of the longitudinal axis of the rock shaft, as to exert pressure on the arm 4 in a direction to hold the springs 11 under compression. Normally, the springs 11 maintain the connecting element C in such a position with relation to the arms 4 on the rock shaft, that no pressure is exerted on the ball bearings 8, but when the rock shaft D is operated to appply the brakes, the movement of the arm 4, against which the springs 11 bear, compresses said springs and brings the ball bearings 8 into service to facilitate the movement or shifting of the connecting element C when said element is adapting itself to the condition or adjustment of the brakes and the brake actuating devices A and B. As soon as the pressure is removed from the rock shaft D, said shaft and the connecting element C return to their former position, shown in Figure 5, wherein the springs 11 function to hold one arm 4 of the connecting element C tightly against its co-acting stop or set screw, thus effectively preventing the relatively movable parts of the structure from rattling. In instances where the brakes are set or adjusted so that in effect the back rods are proportionately shorter than the front rods, the connecting element C, instead of assuming a position with its long axis in exact longitudinal alignment with the axis of the rock shaft D, will assume such a position that its long axis is slightly to one side of the longitudinal axis of the rock shaft, as shown in Figure 11, thereby causing the pull on the front and rear brakes to be substantially equalized by the bodily shifting of the connecting element C.

Having thus described my invention, what I claim as new and desire to secure by Letters Patent is:

1. An operating mechanism for vehicle wheel brakes, composed of a control means that comprises a rock shaft, actuating devices leading to said shaft from front and rear wheel brakes and arranged so as to converge as they approach said shaft, and a connection between said actuating devices and said rock shaft formed by an element interposed between the front and rear actuating devices and combined with said rock shaft in such a way as to be capable of moving longitudinally and transversely relatively to said shaft, for the purpose described.

2. An operating mechanism for vehicle wheel brakes, composed of a mechanism that comprises a rock shaft, actuating devices leading to said shaft from front and rear wheel brakes and arranged so that they converge as they approach said shaft, a connecting element between the front and rear actuating devices floatingly mounted on said rock shaft, and friction reducing bearings interposed between said connecting element and parts on the rock shaft with which it co-acts.

3. An operating mechanism for vehicle wheel brakes, composed of a control means that comprises a rock shaft, actuating devices leading to said shaft from front and rear wheel brakes and arranged so that they converge as they approach said shaft, and a connecting element between said front and rear actuating devices, combined with said rock shaft in such a way as to be capable of a slight rotary movement, longitudinal movement, and transverse movement relatively to said rock shaft.

4. An operating mechanism for vehicle wheel brakes of the kind described in claim 3, which comprises a resilient means for taking up play or lost motion between said connecting element and parts of the rock shaft with which it co-acts.

5. An operating mechanism for vehicle wheel brakes of the kind described in claim 3, provided with means for reducing friction and for taking up play or lost motion between the connecting element and parts of the rock shaft with which it co-acts.

6. An operating mechanism for vehicle wheel brakes, comprising a rock shaft, a shiftable member mounted on said rock shaft so as to partake of the rocking movement of said shaft but capable of moving a limited distance longitudinally and transversely of said shaft, and diverging brake actuating devices leading forwardly and rearwardly from said shiftable member to a plurality of wheel brakes.

7. An operating mechanism for vehicle wheel brakes, comprising a rock shaft, a substantially box-shaped member through which said shaft extends transversely, diverging brake actuating devices leading forwardly and rearwardly from said member to a plurality of front and rear wheel brakes, and means for causing said member to rotate with the rock shaft, said member being mounted on said shaft in such a way as to be capable of moving slightly longitudinally and transversely of said shaft.

8. An operating mechanism for vehicle wheel brakes, comprising a rock shaft provided with laterally projecting arms, a shiftable member on said shaft that overlaps said arms and which is rocked by same when said shaft is actuated, brake actuating devices pivotally connected to said shiftable member and extending in opposite directions from same, means for restricting the movement of said shiftable member relatively to said shaft, and friction reducing bearings arranged between said shiftable member and the arms on said shaft.

9. In an operating mechanism for vehicle wheel brakes, the combination of a force applying means, pairs of diverging actuating devices leading to pairs of wheel brakes, and a rigid connecting member pivotally attached to the inner ends of said actuating devices in such a way as to produce a balanced relationship of substantially horizontally disposed balanced forces, said connecting member being combined with said force applying means so as to be actuated by same but be capable of moving longitudinally and transversely of the longitudinal axis of the vehicle for the purpose described.

10. An operating mechanism for vehicle wheel brakes, composed of a control means that comprises a rock shaft, pairs of actuating devices leading to said shaft from front and rear wheel brakes and arranged so that the devices constituting each of said pairs converge as they approach said shaft, and a means for transmitting movement from said shaft to said actuating devices, constructed so as to be capable of shifting into positions to vary the angular relationship between the respective devices of each of said pairs and also capable of shifting into positions to vary the degree of divergence of said pairs of devices.

11. An operating mechanism for vehicle wheel brakes, composed of a control means that comprises a rock shaft, pairs of actuating devices leading to said shaft from front and rear wheel brakes and arranged so that the devices constituting each of said pairs converge as they approach said shaft, and a shiftable element actuated by said rock shaft and combined with said shaft and said actuating devices in such a way as to be capable of shifting in a manner to vary the angular relationship of the respective devices of each pair or of one pair of devices with relation to the other.

12. In a mechanical brake system having an actuating member, a plurality of brakes and individual brake rods adapted to be moved by said actuating member to apply said brakes, an equalizer, comprising a driving member connected to said actuating member, and a driven member mounted adjacent its center on said driving member for limited movement relative thereto in both longitudinal and lateral directions to allow lateral twisting and longitudinal shifting of said driven member relative to said driving member when said actuating member is operated to compensate for inequalities of adjustment of any of said brakes to insure uniform and simultaneous application thereof.

EDWIN S. HARRISON.